United States Patent
Ma et al.

(10) Patent No.: US 10,305,985 B1
(45) Date of Patent: May 28, 2019

(54) DEFINING NEW PROPERTIES USING EXPRESSIONS IN API CALLS

(71) Applicant: EMC IP Holding Company LLC, Hopkinton, MA (US)

(72) Inventors: Vincent Ma, Shanghai (CN); James O. Pendergraft, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 489 days.

(21) Appl. No.: 14/584,028

(22) Filed: Dec. 29, 2014

(51) Int. Cl.
| | | |
|---|---|---|
| G06F 17/30 | (2006.01) | |
| H04L 29/08 | (2006.01) | |
| H04L 29/06 | (2006.01) | |
| G06F 16/2455 | (2019.01) | |
| G06F 16/2457 | (2019.01) | |

(52) U.S. Cl.
CPC ...... H04L 67/1097 (2013.01); G06F 16/2455 (2019.01); G06F 16/24578 (2019.01); H04L 67/42 (2013.01)

(58) Field of Classification Search
CPC ........... G06F 17/30477; G06F 17/3053; G06F 16/2455; G06F 16/24578
USPC ........................................................ 707/769
See application file for complete search history.

(56) References Cited

U.S. PATENT DOCUMENTS

| | | | | |
|---|---|---|---|---|
| 6,160,549 A * | 12/2000 | Touma | ............... | G06F 17/30554 707/999.003 |
| 7,082,433 B2 * | 7/2006 | Anonsen | ............. | G06F 16/2452 |
| 7,797,304 B2 * | 9/2010 | Muralidhar | ............. | G06F 16/40 707/713 |
| 7,865,533 B2 * | 1/2011 | Meijer | ............... | G06F 17/30967 707/804 |
| 8,131,739 B2 * | 3/2012 | Wu | .................... | G06F 17/30067 707/758 |
| 8,775,411 B1 * | 7/2014 | Ransil | ............... | G06F 17/30336 707/716 |
| 8,856,151 B2 * | 10/2014 | George | ................. | G06F 16/283 707/755 |
| 9,020,972 B1 * | 4/2015 | Gaun | .................. | G06F 16/2428 707/779 |
| 9,223,827 B2 * | 12/2015 | Hou | ................... | G06F 17/30427 |
| 9,275,120 B2 * | 3/2016 | Mayer | ............... | G06F 17/30569 |
| 9,336,327 B2 * | 5/2016 | Melnik | ............. | G06F 16/24522 |
| 9,348,894 B2 * | 5/2016 | Asadullah | ......... | G06F 17/30657 |
| 2002/0184192 A1 * | 12/2002 | Hongell | ............ | G06F 17/30607 |
| 2004/0003132 A1 * | 1/2004 | Stanley | ............. | G06F 17/30286 719/316 |
| 2005/0086049 A1 * | 4/2005 | Bennett | .................. | G06F 17/27 704/4 |

(Continued)

*Primary Examiner* — Mark E Hershley
(74) *Attorney, Agent, or Firm* — Muirhead and Saturnelli, LLC

(57) ABSTRACT

Described are techniques for request processing. A server receives from a client a request for first data to be returned to the client. The first data includes a first property of an object. The object is included in an object model and includes a predefined property. The first property is not a predefined property of the object and is a new property defined using an expression included in the request. The request includes any of the predefined property and a constant. First processing is performed at the server to service the request and obtain the first data. At the server in accordance with the first processing, a response to the request including the first data is generated.

18 Claims, 17 Drawing Sheets

(56) References Cited

U.S. PATENT DOCUMENTS

| | | | |
|---|---|---|---|
| 2005/0108209 A1* | 5/2005 | Beyer | G06F 17/30932 |
| 2006/0224627 A1* | 10/2006 | Manikutty | G06F 17/30938 |
| 2006/0242167 A1* | 10/2006 | Singh | G06F 17/30067 |
| 2007/0073663 A1* | 3/2007 | McVeigh | G06F 17/30477 |
| 2007/0208669 A1* | 9/2007 | Rivette | G06F 17/30011 |
| | | | 705/59 |
| 2008/0133479 A1* | 6/2008 | Zelevinsky | G06F 17/30696 |
| 2008/0189277 A1* | 8/2008 | Meijer | G06F 17/30392 |
| 2008/0195610 A1* | 8/2008 | Tin | G06F 17/30448 |
| 2008/0319957 A1* | 12/2008 | Muralidhar | G06F 17/30436 |
| 2009/0150367 A1* | 6/2009 | Melnik | G06F 16/24522 |
| 2009/0307192 A1* | 12/2009 | Hughes | G06F 17/30607 |
| 2009/0319498 A1* | 12/2009 | Zabokritski | G06F 17/30427 |
| 2010/0070448 A1* | 3/2010 | Omoigui | H01L 27/1463 |
| | | | 706/47 |
| 2010/0094829 A1* | 4/2010 | Castellanos | G06F 17/30306 |
| | | | 707/705 |
| 2011/0113054 A1* | 5/2011 | McLean | G06F 16/8358 |
| | | | 707/769 |
| 2012/0197865 A1* | 8/2012 | Koch | G06F 17/30457 |
| | | | 707/713 |
| 2013/0080837 A1* | 3/2013 | Chandra | G06F 11/366 |
| | | | 714/38.1 |
| 2014/0074771 A1* | 3/2014 | He | G06F 17/30389 |
| | | | 707/602 |
| 2014/0089254 A1* | 3/2014 | Simon | G06F 17/30433 |
| | | | 707/609 |
| 2014/0380145 A1* | 12/2014 | Wilsher | H04L 12/287 |
| | | | 715/234 |
| 2015/0026165 A1* | 1/2015 | Louie | G06F 17/30699 |
| | | | 707/723 |
| 2015/0088898 A1* | 3/2015 | Branch | G06F 17/30336 |
| | | | 707/741 |
| 2015/0128103 A1* | 5/2015 | Stratton | G06F 8/00 |
| | | | 717/100 |
| 2015/0131444 A1* | 5/2015 | Malatack | H04L 47/125 |
| | | | 370/235 |
| 2015/0248277 A1* | 9/2015 | Sabbouh | G06F 8/10 |
| | | | 717/104 |
| 2015/0278311 A1* | 10/2015 | Isherwood | G06F 17/30705 |
| | | | 707/741 |
| 2016/0217181 A1* | 7/2016 | Kadouch | G06F 16/951 |

* cited by examiner

```
{
  "@base": "https://10.108.49.209/api/types/pool/instances? fields=sizeTotal,sizeUsed,
    percentUsed::sizeUsed*100/sizeTotal,id&per_page=2000&compact=true",
  "updated": "2014-11-09T14:09:36.520Z",
  "links":
    [ { "rel": "self", "href": "&page=1" } ],
  "entryCount": 1, ——————— 408
  "entries":
  [ {
    "content":
    {
      "id": "pool_1", ——————————— 411
      "sizeTotal": 426812375043, ——— 412
      "sizeUsed": 6710886400, ———— 414
      "percentUsed": 15.72327 ——— 416
    }
  } ]
}
```

FIG. 5

```
GET https://10.108.49.209/api/types/pool/instances?
                            ⎧ fields=sizeTotal, sizeUsed,
                       330 ⎨
                            ⎩              percentUsed::sizeUsed*100/sizeTotal
                                                                    ⏟
                                                                   324
                       510 ⎧ &filter=percentUsed lt 50
                            ⎩         ⏟
                                     512
```

GET https://10.108.49.209/api/types/pool/instances?fields=sizeTotal, sizeUsed, percentUsed::sizeUsed*100/sizeTotal&orderby=percentUsed asc

FIG. 7

```
{
    "@base": "https://10.108.53.189/api/types/linkAggregation/instances?
              fields=slavePorts,portNum::@count(slavePorts)",
    "updated": "2014-11-10T13:02:09.918Z",
    "links": [
        {
            "rel": "self",
            "href": "&page=1"
        }
    ],
    "entryCount": 1,                                                    ─── 1002
    "entries": [
        {
            "content": {
                "slavePorts": [
                    { "id": "spa_iom_0_eth1" },                         ─── 1020
                    { "id": "spa_iom_0_eth0" }                          ─── 1022
                ],
                "id": "spa_la_0_1",                                     ─── 1024
                "portNum": 2                                            ─── 1026
            }
        }
    ]
}
```

| Query results table 1140 | | | |
|---|---|---|---|
| ID 1142 | sizeTotal 1144 | sizeUsed 1146 | percentUsed 1148 |
| | | | |
| | | | |
| | | | |

1150

```
SELECT _ID AS ID, _sizeTotal AS sizeTotal, _sizeUsed AS sizeUsed,
    (_sizeUsed*100/_sizeTotal) AS percentUsed FROM _POOL WHERE (_sizeUsed*100/_sizeTotal) < 50

ORDER BY (percentUsed)
```

FIG. 15

DEFINING NEW PROPERTIES USING EXPRESSIONS IN API CALLS

BACKGROUND

Technical Field

This application generally relates to application programming interfaces (APIs) and defining new properties in an API call or request using expressions.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of request processing comprising: receiving, at a server from a client, a request for first data to be returned to the client, the first data including a first property of an object, wherein the object is included in an object model and the object includes a predefined property, wherein the first property is not a predefined property of the object and the first property is a new property defined using an expression included in the request, the expression including any of: the predefined property and a constant; performing first processing at the server to service the request and obtain the first data; and generating, at the server in accordance with the first processing, a response to the request, the response including the first data. The server may be a data storage system, the client may perform data storage system management, and the request may be a request to retrieve the first data including the object which represents an entity in the data storage system. The first data may include data storage system configuration information stored in a database. The first processing may include transforming the request into a database query; executing the database query with respect to the database; and receiving, from the database, query results including the first data. The step of transforming may comprise forming a select statement including a column alias wherein the new property is specified as the column alias having a definition specified as the expression. The request may include filtering criteria and the step of transforming may include a clause in the select statement specifying the filtering criteria. The filtering criteria of the request may reference the new property. The request may include sorting criteria and the step of transforming may include a clause in the select statement specifying the sorting criteria. The sorting criteria of the request may reference the new property. The request may include pagination criteria identifying a portion of the query results to be returned to the client, and the step of transforming may include one or more clauses in the select statement specifying the pagination criteria. The pagination criteria of the request may reference the new property. The new property may have a definition that is specified by the expression, and the definition for the new property may be recognized and used by the server only for servicing the request and not any other requests from the client. The request and response may be in accordance with a defined application programming interface, wherein the defined application programming interface may include a first parameter, and wherein the request may specify the first parameter comprising the predefined property, the first property and the expression.

In accordance with another aspect of the invention is a system comprising: a data storage system; and a computer system comprising a memory including code of a data storage system management application, wherein the data storage system is a server and the data storage system management application is a client; and the data storage system further comprises a second memory including code thereon that, when executed, performs a method of request processing comprising: receiving, at the data storage system from the data storage system management application, a request for first data to be returned to the data storage system management application, the first data including a first property of an object, wherein the object is included in an object model and the object includes a predefined property, wherein the first property is not a predefined property of the object and the first property is a new property defined using an expression included in the request, the expression including any of: the predefined property and a constant; performing first processing at the data storage system to service the request and obtain the first data; and generating, at the data storage system in accordance with the first processing, a response to the request, the response including the first data.

In accordance with another aspect of the invention is a computer readable medium comprising code stored thereon that, when executed, performs a method of request processing comprising: receiving, at a server from a client, a request for first data to be returned to the client, the first data including a first property of an object, wherein the object is included in an object model and the object includes a predefined property, wherein the first property is not a predefined property of the object and the first property is a new property defined using an expression included in the request, the expression including any of: the predefined property and a constant; performing first processing at the server to service the request and obtain the first data; and generating, at the server in accordance with the first processing, a response to the request, the response including the first data. The server may be a data storage system, the client may perform data storage system management, and the request may be a request to retrieve the first data including the object which represents an entity in the data storage system. The first data may include data storage system configuration information stored in a database. The first processing may include transforming the request into a database query; executing the database query with respect to the database; and receiving, from the database, query results including the first data. The step of transforming may comprise forming a select statement including a column alias, wherein the new property may be specified as the column alias having a definition specified as the expression. The request may include filtering criteria and the step of transforming may include a clause in the select statement specifying the filtering criteria. The request may include any of filtering criteria referencing the new property, sorting criteria referencing the new property, and pagination criteria referencing the new property. The new property may have a definition that is specified by the expression, and the definition for the new property may be recognized and used by the server only for servicing the request and not any other requests from the client.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4, 6, and 7 are examples requests that may be used in an embodiment in accordance with techniques herein;

FIGS. 5, 9, and 11 are examples of responses that may be used in an embodiment in accordance with techniques herein;

FIG. 14 is an example of a query results table that may be used in an embodiment in accordance with techniques herein;

FIG. 15 is an example of a select statement that may be used in an embodiment in accordance with techniques herein.

DETAILED DESCRIPTION OF EMBODIMENT(S)

Figure 1:
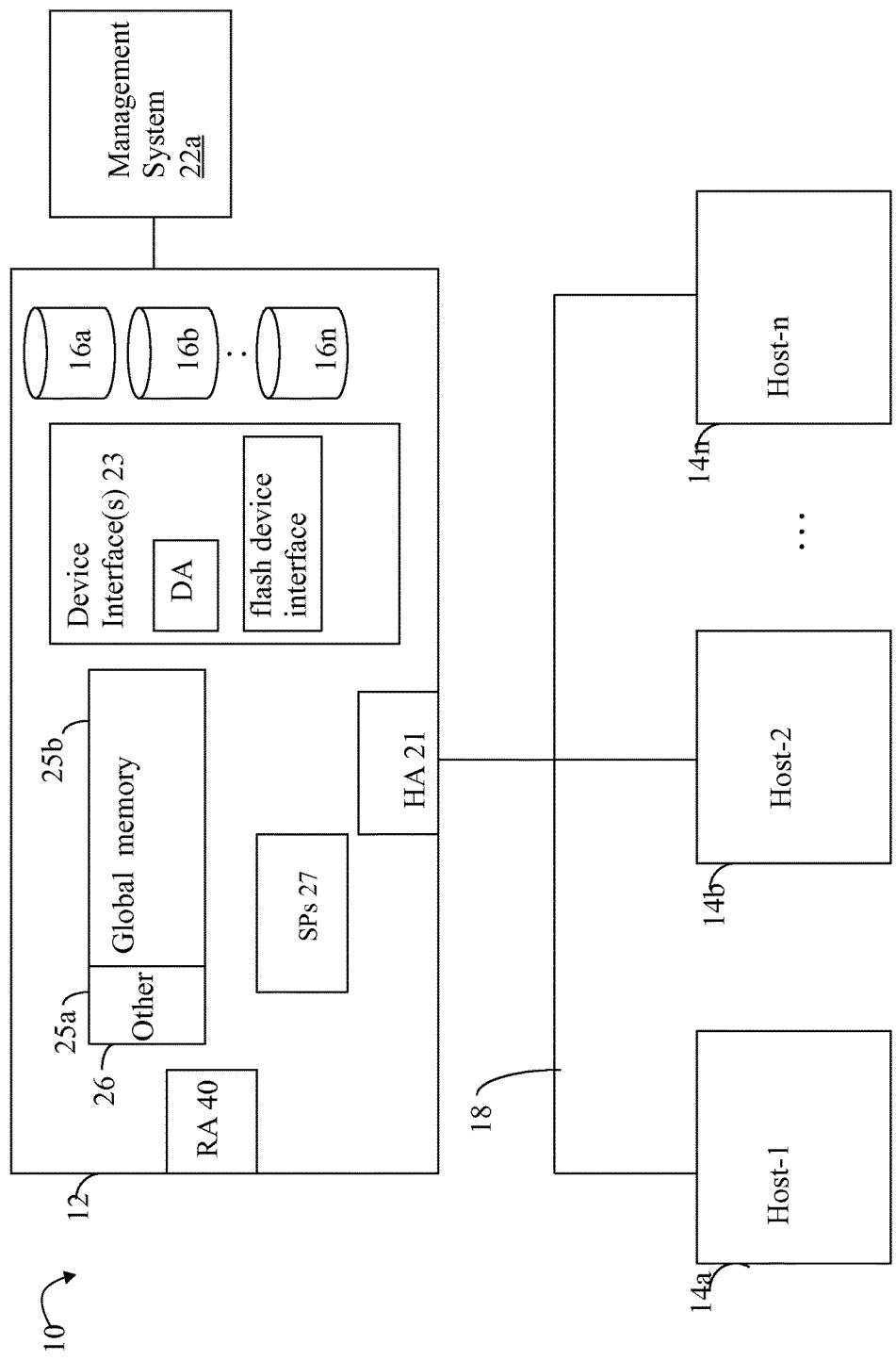
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe®data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Management software may be used in connection with management of data storage systems. The management software, as well as more generally any software, may obtain inputs used in connection with performing an operation or task. The management software may be characterized as a client which issues requests to a server, such as a data storage system, in connection with performing requested operations. In one embodiment, the data storage system management software, as a client, may execute on a computer system which communicates with the data storage system that services data storage system management requests from the client. The data storage system management software included in the management system 22a may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like. During operation of the data storage system management application, its GUI may issue a command request such as in the form of an API call to the data storage system to service the command request. In response to receiving the request, the data storage system may perform processing to service the request and return a response such as, for example, including any requested data storage system configuration information.

As described in more detail in following paragraphs, the command request issued by the GUI may be, for example, to view information regarding logical and/or physical data storage system entities of the data storage configuration (e.g., list physical storage devices and associated properties and statuses, list logical storage entities such as logical devices having storage provisioned on physical storage devices, list properties of such logical devices), perform an operation (e.g., create, delete, modify) with respect to a logical storage entity (e.g., logical storage device, storage group of one or more logical storage devices)) of the configuration, and the like. The data storage system may include, or otherwise have access to, a data base, or more generally any suitable data container or data store, comprising the data storage system configuration information. The data storage system configuration information may describe the current configuration of the data storage system. The data storage system configuration information may include an object model representation of the different physical and logical entities in the data storage system. For example, the configuration information may include objects representing current configuration and state of physical entities such as physical storage devices (e.g., disks, solid state storage devices), power supplies, and the like. The configuration information may also include objects representing current configuration and state of logical entities such as RAID groups and/or storage pools (e.g., configured logical groupings of physical storage devices), LUNs having physical storage configured from such RAID groups and/or storage pools, storage groups (e.g., logical groupings of one or more LUNs), and the like.

In this manner, the data storage system as a server may service a request from the GUI of the data storage system management software such as by retrieving requested data from the data storage system configuration information data base in connection with a request to get or read configuration information. Servicing performed by the data storage system may also include creating, updating and/or otherwise generally modifying the data storage system configuration information database in connection with a request, for example, to provision storage for a new LUN, create a new storage group, add new physical storage devices to the system and therefore create corresponding new objects in the database, and the like. In one embodiment, the data storage system configuration information database may include multiple tables of different types of objects. Each object may include one or more properties characterizing and describing the physical or logical entity represented by the object. Further examples and additional details regarding objects, properties, the database, client requests and server responses are set forth in following paragraphs.

In one embodiment, requests (sent from the client to the server) and responses (returned from the server to the client in response to a received request) may be in accordance with a RESTful management web API. Additionally, in an example of an embodiment in accordance with techniques herein using a RESTful management API, requests and responses may be transmitted in accordance with HTTP (Hypertext Transfer Protocol) where each resource, such as an object, may be identified using a uniform resource locator (URL).

Generally, as known in the art, a REST (Representational state transfer) API or RESTful API, may be characterized as having characteristics described in following paragraphs.

A REST API follows and provides a client-server model. A uniform interface separates clients from servers. This separation of concerns means that, for example, clients are not concerned with data storage, which remains internal to each server, so that the portability of client code is improved. Servers are not concerned with the user interface or user state, so that servers can be simpler and more scalable.

A REST API is stateless in that the client-server communication is further constrained by no client context being stored on the server between requests. Each request from any client contains all the information necessary to service the request, and session state is held in the client. In other words, the necessary state to handle the request is contained within the request itself, whether as part of the URI, query-string parameters, body, or headers. The URI uniquely identifies the resource and the body contains the state (or state change) of that resource. Then after the server does performs its processing of the request, the appropriate state, or the piece(s) of state that matter, are communicated back to the client via headers, status and response body.

Consider, for example, the concept of a session which may maintain state or context across multiple HTTP requests. In REST, the client includes all information for the server to fulfill the request in the request message, resending state as necessary if that state must span multiple requests.

Statelessness enables greater scalability since the server does not have to maintain, update or communicate that session state.

In a REST API, such as may be used on the web or internet, clients can cache responses. Thus, responses either implicitly or explicitly define themselves as cacheable, or not, to prevent clients from reusing stale or inappropriate data in response to further requests. Well-managed caching partially or completely eliminates some client-server interactions, further improving scalability and performance.

A REST API may be used to provide a layered system with one or more layers of servers. In such a layered system with the REST API, a client may not typically be able to detect whether it is connected directly to the end server, or to an intermediary along the way. Intermediary servers may improve system scalability by enabling load balancing and by providing shared caches.

A REST API provides a uniform interface that simplifies and decouples the architecture, enabling clients and servers to exist and operate independently. Further characterizations of this uniform interface in a REST API are:

1. Identification of resources. Individual resources are identified in requests. The resources themselves are conceptually separate from the representations that are returned to the client. For example, the server may send data describing an object or resource from its database in the form of an HTML, JSON, or XML description, none of which are the server's internal representation. However the HTML, JSON or XML description as well as the server's internal representation identify and describe the same resource independent of the manner or representation of such information describing the resource.

2. Manipulation of resources through these representations. When a client holds a representation of a resource, the client has sufficient information to modify or delete the resource (provided the client has appropriate permissions to perform such operations).

3. Self-descriptive messages. Each message includes enough information to describe how to process the message. For example, responses may explicitly indicate their cacheability.

4. Hypermedia as the engine of application state (HATEOS). Clients deliver state via body contents, query-string parameters, request headers and the requested URI (the resource name). Services or servers deliver state to clients via body content, response codes, and response headers. This is technically referred-to as hypermedia (or hyperlinks within hypertext). Thus, clients make state transitions only through actions that are dynamically identified within hypermedia specified by the server. When necessary, links may be contained in the returned body (or headers) of a message to supply the URI for retrieval of the object itself or related objects. Generally, the client does not assume that any particular action is available for any particular resources beyond those described in representations previously received from the server. It should be noted that in some implementations considered RESTful, HATEOS may be considered an optional feature or characteristic.

5. As an option, a REST API may optionally provide the feature of code on demand (COD). With COD, servers can temporarily extend or customize the functionality of a client by the transfer of executable code. Examples of this may include compiled components or bodies or code such as, for example, Java applets and client-side scripts, such as JavaScript. "Code on demand" is the only optional feature or characterization of the REST architecture.

Applications and APIs having the foregoing characterization or features may be described as "RESTful". For example. HTTP based RESTful APIs may be defined with these aspects: a base resource identifier (e.g., http://example.com/resources/), an Internet media type for the data (e.g., HTML, XML, and the like), standard HTTP methods (e.g., GET, PUT, POST, or DELETE), hypertext links to reference state, and hypertext links to reference related resources. As noted above, a RESTful API may include at least the above-mentioned characteristics 1-3 and may optionally include characteristics 4 and/or 5. Additionally, a RESTful API may also be characterized as being compliant with the HTML standard.

In one embodiment using a RESTful API in connection with data storage system management, a request may be issued from the client to GET properties of one or more instances of an object such as a POOL object in the object model used for data storage system configuration information. For example, the following is an example of a query or request that may be issued from the client to return values of two predefined properties for all POOL objects:

GET https://10.108.49.209/api/types/pool/instances?fields=sizeTotal,sizeUsed

The above is an example of a request that may be issued by a client, such as the data storage system management software, to obtain two predefined object properties of sizeTotal and sizedUsed defined in the object model for POOL objects. SizeTotal may represent the total size (e.g. amount of storage) in the POOL and sizeUsed may represent the amount of pool storage that has been used or consumed. For simplicity in this example, assume only a single POOL is currently defined.

Such object properties like the above-mentioned two object properties may be characterized as static and predefined in that they are included in the object model definition. A REST client, such as data storage system management software, issuing the GET request may also need a new property about an object, such as the POOL object. The new property may be, for example, derived or determined from one or more existing predefined object properties. More generally, the new property may be of a particular supported type, such as boolean/logical, arithmetic or numeric, string or character, integer, real number, and the like. The new property may be defined using an expression suitable for the particular type. For example, assume a new property of type arithmetic or numeric which may be represented as an arithmetic expression using one or more existing properties. The expression may use, for example, integer and/or real numbers, percentages, mathematical operators (e.g., addition, subtraction, multiplication, division), relational operators (e.g., relational operators, such as =, < >, <, >, <=, and >=, compare values to one other and may be used in connection with multiple types such as numerical as well as string or character-based data), logical operators (e.g., AND, OR, NOT NAND, NOR, XOR), string operations (e.g., append, concatenate, search for substring, remove string or characters from another string, count a number of strings in a string array) and the like.

The particular operators in an expression may vary with the particular type of the property. For example, for a new property that is a boolean, the new property may be defined using an expression that includes numeric and/or character or string-based values (e.g., constants and predefined properties), and one or more logical operators. For a new property that is an integer or other numeric type, the new property may be defined using an expression that does not include logical operators and rather includes one or more mathematical operators along with any of a numerical constant (e.g., integer or real), and a predefined property that is a numerical value.

To further illustrate, the new property for a POOL object may be "percentUsed" representing how much in terms of a percentage of the POOL has been consumed in configuring storage for LUNs. PercentUsedfor a POOL object may be derived from the two existing predefined properties of sizeTotal and sizeUsed for the POOL mentioned above. PercentUsed for a POOL may be calculated using the following arithmetic expression of EQUATION 1:

$$percentUsed = sizeUsed/sizeTotal * 100\%  \quad \text{EQUATION 1}$$

where percentUsed is an integer quantity denoting the percentage of the POOL that has been consumed, used or allocated in configuring LUNs;

sizeTotal is an integer quantity expressed in terms of storage units, such as GBs, MBs, and the like, denoting the total storage in the POOL; and sizeUsed is an integer quantity expressed in terms of storage units (e.g., similar to sizeTotal noted above) denoting the amount of storage on the POOL that has been consumed or used.

In a system and API not using techniques herein, the client may issue the request as in such as the GET request noted above to obtain the predefined object properties for each defined POOL object The client may receive a response to the GET request with the requested predefined properties of sizeTotal and sizeUsed and the client may perform the calculations based on EQUATION 1 for each POOL to obtain the new property for each such POOL. However, performing such calculations on the client increases the complexity of code on the client side and also uses client-side resources.

Additionally, operations performed client-side using such a new property (e.g., derived from one or more existing object properties) may not be scalable as the number of pools or other objects increases. For example, the client may want to perform one or more operations such as sorting, filtering and/or paging based on this new property. Performing such operations may require first obtaining all instances of objects in a data set. For example, the client may want to sort or order POOL objects in a list based on sorting criteria such as increasing or decreasing values of the new property percentUsed. In order to perform this operation on the client side using the new property percentUsed, the client may perform processing including requesting and receiving predefined properties of sizeTotal and sizeUsed for all pools, calculating the new property percentUsed for each pool as in EQUATION 1, and then sorting all the pools in a list having a desired ordering (e.g., ascending or descending as specified in sorting criteria) based on the new property percentUsed of each pool.

In a similar manner, other supported operations that may be performed based on the new property may include filtering and paging. Filtering may be an operation performed that filters a data set based on filtering criteria whereby the filtering results may be displayed, such as in a list on the UI display. Filtering criteria may be represented as a logical and/or numerical expression. For example, filtering criteria based on the new property percentUsed may be to display pools in the list having a percentUsed value that is within a particular range, more than a specified threshold, less than a specified threshold, equal to a specified value, and the like. In order to perform such an operation client-side using the new property percentUsed, the client may perform processing including requesting and receiving predefined properties of sizeTotal and sizeUsed for all pools, calculating the new property percentUsed for each pool as in EQUATION 1, and determining which of the pools have the percentUsed in accordance with specified filtering criteria. For example, if the filtering criteria indicates to list all pools having a percentUsed value that is less than a specified threshold, the client may also sort the pools in a list having a desired ordering (e.g., ascending or descending) based on the new property percentUsed of each pool, and then determine the position of the particular pools in the list meeting the criteria in order to selectively display such pools meeting the filtering criteria.

Paging may be another supported operation performed with respect to a data set to partition the data set into discrete portions each no more than a particular size. In this manner, the data set may be displayed a portion at a time such as on a UI display.

It should be noted that one or more operations of the foregoing operations may be performed in combination on a data set. For example, filtering and sorting may be used in combination to display results meeting filtering criteria where the results are in a particular sorted order meeting sorting criteria. Paging, filtering and sorting are described in more detail in following paragraphs.

In connection with a system and API not using techniques herein, there may be an unacceptable adverse impact to client-side performance in order to perform the foregoing operations client side in connection with the new property derived from one or more predefined object properties.

In connection with a system and API not using techniques herein, such new properties may simply be added to the object definition and calculated and stored for each object instance. However, this has disadvantages such as requiring updates to the server-side object model and definition each time a new property is needed, and increasing storage size requirements of each object instance to include the new property.

As an alternative to the foregoing, an embodiment of a system and API may operate in accordance with techniques herein whereby the client has the ability to define new properties using expressions included in the request API parameters. As described in more detail below, techniques herein provide flexibility for the client in defining new properties in a GET request based on predefined properties and/or constants (e.g., string and/or numeric) and the response received from the server includes the new properties in a manner similar to requested predefined properties. In other words, new properties are returned as part of the response just as if such new properties were also predefined. In connection with techniques herein, the server (rather than the client) performs processing to calculate the new property value for all objects. The server may also perform any processing for additional operations such as sorting, filtering and/or pagination as may be specified in the request. Additionally, the new property does not result in a modification to the existing object model and does not result in storing the new property for each object instance. Thus, use of techniques herein to define the new property in the request provides for simplified client-side processing that is scalable and flexible. An embodiment in accordance with techniques herein may use a RESTful API as known in the art and as characterized herein.

Figure 2:
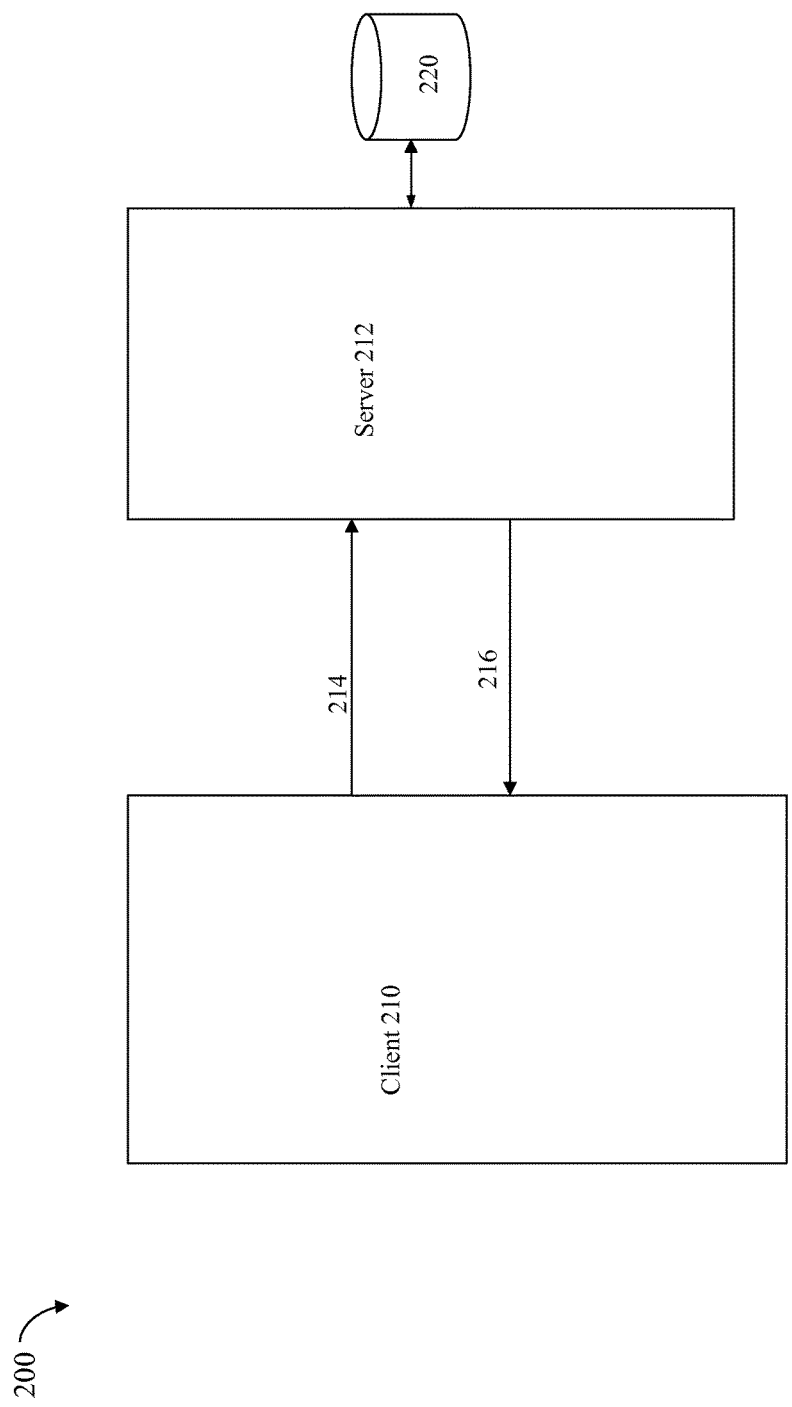
FIG. 2 is an example of a system including a client and server in an embodiment in accordance with techniques herein.

Referring to FIG. 2, shown is an example 200 of a system operating in accordance with techniques herein. The example 200 includes a client 210 and a server 212. In one embodiment in accordance with techniques herein, the client 210 may be a system including data storage system management software, and the server 212 may be a data storage system. In the example embodiment where the server 212 is a data storage system and the client 210 includes data storage system management software issuing the request 214, element 220 may be a data store including data storage configuration information describing the current configuration of the data storage system. The data store 220 may be, for example, a database, or more generally, any suitable data container of the data storage configuration information.

The client 210 may issue a request 214 to the server 212 where the request 214 uses a REST API in accordance with techniques herein. The request 214 may be a request to read or GET data storage configuration information from the data store 220. The request 214 may define a new property inline in the request as a request parameter. The new property may be specified using an expression such as described elsewhere herein with one or more operands and operations. In one embodiment using techniques herein, each of the one or more operands in the expression defining the new property of an object may be a predefined property of an object or a constant (e.g., numeric constant value such as 100 or 10.5, or a string constant value such as "ABC"). Examples and further details regarding requests that may be used in an embodiment in accordance with techniques herein are described elsewhere herein.

In response to receiving the request 214, the server 212 may perform processing to service the request. Such processing may include retrieving information from the data store 220, performing calculations based on the expression for the new property to determine all instances of the new property for one or more objects specified in the request, and performing any other additional operations such as filtering, sorting, and/or paging based on the new property as may also be specified in the request. Once the server 212 has completed processing for the request, the server sends a response 216 to the client including the requested information. Examples and further details regarding responses that may be used in an embodiment in accordance with techniques herein are described elsewhere herein.

The new property defined in the request 214 has a definition that is specified by the expression also included in the request, and the definition for the new property may be recognized and used by the server only for servicing the request and not any other requests from the client. This is one aspect of a REST API in that the API is stateless and each request from the client is independent and includes all information for that request. the new property and its definition included in the first request 214 are not retained as part of any defined state on the server and are not therefore retained or defined automatically for use in connection with a second client request.

It should be noted that examples described herein may refer to a client that is an application including a GUI. However, techniques herein may be used more generally in an embodiment with any suitable client including one that does not have a GUI. Additionally, techniques herein may also be illustrated with reference to an embodiment where the client and server are on two different systems and where the server is a data storage system. More generally, the client and server may be any suitable system or component (e.g., server does not have to be a data storage system). Furthermore, the client and server may both operate in the same physical system. For example, as a variation to an embodiments described herein, the client (as the GUI-based data storage management application) may execute on processor of the data storage system itself where client requests are serviced using a database also located on the data storage system or otherwise accessible to the data storage system.

Figure 3:
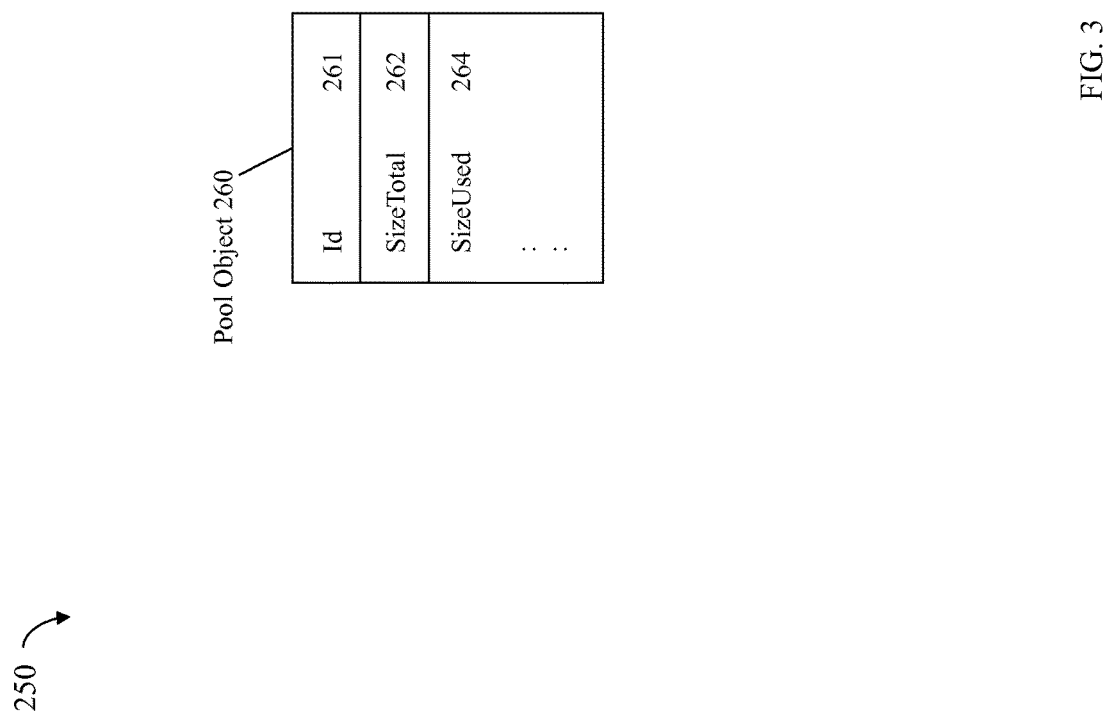
FIGS. 3 and 12 are examples of objects that may be used in an embodiment in accordance with techniques herein.

Referring to FIG. 3, shown is an example 250 of properties that may be included in each pool object in an embodiment in accordance with techniques herein. The data storage system configuration information of 220 may include a pool object for each pool of storage that has been configured in the data storage system. In this example, each pool object 260 may include properties comprising id 261, sizeTotal 252 and sizeUsed 264 as well as other properties. SizeTotal 252 and sizeUsed 264 may be as described above such as in connection with EQUATION 1. Id 261 may be a unique pool identifier used to uniquely identify a pool object. In this example, the pool object 260 does not include a property percentUsed, such as also described in connection with EQUATION 1, for each pool object. Thus, the client may issue a request in accordance with techniques herein using a REST API in which a new property percentUsed is defined by an expression included in the request URL parameter. The new property percentUsed for a pool object is derived from sizeTotal and sizeUsed for that pool object.

Figure 4:
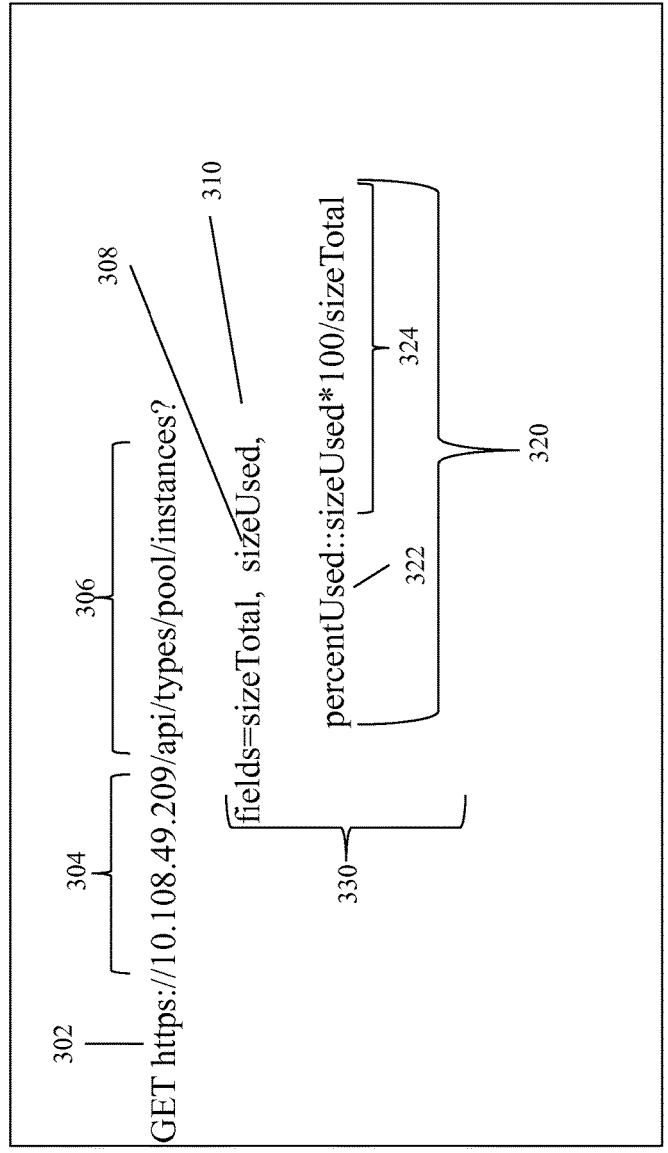

Referring to FIG. 4, shown is an example of a URL that may be sent from the client to the server in a GET request in an embodiment using a REST API in accordance with techniques herein. In the example 300, element 302 identifies the protocol used for the request. HTTPS (Hypertext Transfer Protocol Secure) is one example of a protocol used in connection with host or server communications for the resource identified by the URL. As known in the art, HTTPS is a combination of Hypertext Transfer Protocol (HTTP) with the SSL (secure socket layer)/TLS (transport layer security) protocol. It provides encrypted communication and secure identification of a network web server. HTTPS signals the client browser to use an added encryption layer of SSL/TLS in connection with HTTP when communicating with a server such as to retrieve a requested resource over the internet from the server. In connection with HTTPS, processing may be performed which includes server authentication (e.g., such as by the client examining and validating/verifying the server's digital certificate and that the certificate correctly and properly identifies an expected trusted entity associated with the server's website or internet address). Thus, specifying that the server providing the resource(s) (e.g., corresponding to the one or more objects identified by the URL request) use HTTPS is one way of ensuring that the above-mentioned validation or verification of the server's identify is performed.

Element 304 specifies the server location and may be an IP address (e.g., web address) for the server. Alternatively, the location may be specified using names for a domain, subdomain, and the like, such as using an FQDN (fully qualified domain name) corresponding to the illustrated IP address 304. As known in the art, when using domain names, the domain name server (DNS server) then resolves the r server name to its IP address through a name resolution process using its DNS tables.

Element 306 identifies the one or more objects, or more generally, one or more resources. In this example, "api/types/pool/instances" specifies syntax identifying all pool objects or instances. It should be noted that rather than have 306 specify all pool objects, a request may specifically identify one or more pool objects, such as using unique pool identifiers, in request portion 306.

Element 330 (including 308, 310 and 320 following the "?" in the request) comprises the query portion of the URL and may include one or more query parameters. In this example, element 330 specifies a query parameter including elements 308, 310 and 320 identifying the particular object properties of all pool instances that are to be returned in a response to the requesting client. Element 308 requests the value of the predefined property sizeTotal for all pool objects. Element 310 requests the value of the predefined property sizeUsed for all pool objects.

Additionally, element 322 requests the value of the dynamically defined new property percentUsed for all pool objects. Element 324 specifies an expression providing a definition for the new property. In this example, the expression "sizeUsed*100/sizeTotal" specifies an arithmetic expression denoting a calculation performed to determine the value of the new property percentUsed as a derived parameter from the two predefined object properties of sizeUsed and sizeTotal. Additionally, element 324 includes an integer constant "100" in the expression so that the value for the new property percentUsed is an integer quantity as described above in EQUATION 1.

It should be noted that other embodiments may use other syntax in connection with specifying requests and responses than as specified in FIG. 4 as well as other examples herein. For example, the particular syntax such as specified for expressions, parameters and other portions of 330 in the example of FIG. 4 may vary with embodiment. Similarly, the particular operations, data types, and the like, specified in a request that are supported may vary with embodiment.

Thus, the example 300 illustrates a URL request in accordance with a REST API where the client dynamically defines the new property 322 using an expression 324. In response to receiving the request 300, the server performs processing to service the request and return the requested information. More specifically, the server may perform processing including retrieving properties sizeTotal and sizeUsed for all pool objects from the data store of data storage system configuration information, calculating the new property percentUsed 322 for each pool object based on expression 324 (including predefined properties for the pool object), and returning a response to the client including the predefined properties sizeTotal and sizeUsed along with the new property percentUsed for each pool object in the current data storage system configuration.

It should be noted that generally, the new property percentUsed defined using the expression 324 may be further referenced or reused in other expressions in the same request. For example, the new property percentUsed may be a first new property and the same request may also define a second new property using a second expression where the second expression references "percentUsed". To further illustrate, the following URL request:
GET https://10.108.49.209/api/types/pool/instances?
  fields=sizeTotal, sizeUsed,
  percentUsed:::sizeUsed*100/sizeTotal,
  secondNEW::percentUsed*60
is a variation of the GET request 300 of FIG. 4 in that a second new property, secondNEW is defined using the second expression "percentUsed*60" whereby the second expression references the first new property, percentUsed, in defining the second new property. In connection with the above-referenced request, an additional second new property secondNEW is also calculated on the server and returned in the response for each pool object.

It should be noted that the foregoing example as well as others herein may request predefined object properties, such as sizeTotal and sizeUsed, in combination with a calculated value for a new property based on such predefined object properties. As an alternative, the GET request may just request that the calculated value for the new property be returned without the predefined object properties as a practical implementation. However, both predefined properties and new properties based on such predefined properties may also be returned as in examples herein for illustration.

Referring to FIG. 5, shown is an example of a response that may be returned by the server for the request 300 of FIG. 4. The example 400 includes a response in accordance with the HTTP protocol or standard and includes the requested information for the pool objects of the data storage system configuration information. In this simplified example, there is only a single defined pool although an embodiment may practically include any suitable number of pools for the particular data storage system configuration. In this example, element 408 denotes the number of entries or pool objects having properties listed in the request. Element 410 includes the requested object properties of the request for each pool object. In this example as mentioned above there is a single pool object and element 410a indicates the information returned for the single pool object. Element 411 includes the pool id or identifier property uniquely identifying the pool object instance from all other pool objects. It should be noted that the pool identifier may be returned for each pool object instance in order to distinguish different pool objects. Element 412 specifies the property value for the predefined property sizeTotal. Element 414 specifies the property value for the predefined property sizeUsed. Element 416 specifies the property value for the new property as defined by the client. Elements 412, 414 and 416 correspond to requested property values specified in the request 300 of FIG. 4.

Referring to FIG. 6, shown is another example of a URL that may be sent from the client to the server as a request in an embodiment using a REST API in accordance with techniques herein. The example 500 is a further variation of the request from FIG. 4 in that the request 500 includes an additional second query parameter 510. Element 510 identifies an additional operation or processing that is being requested to be performed by the server to filter the results in accordance with filtering criteria 512. The filtering criteria 512 may also be defined using an expression in a manner to that as described herein for defining an expression used with new property definitions. In this example, the filtering criteria 512 is an expression referencing the new property percentUsed defined by the previous expression 324 of the first URL query parameter 330. In this example, the filtering criteria 512 specifies "percentUsed lt 50" denoting filtering criteria of percentUsed <(e.g., less than) 50. Thus, the filtering criteria 512 indicates that the response should only include sizeTotal, sizeUsed and percentUsed for pool objects having a percentUsed value that is less than 50.

In this particular example with only a single pool, the response returned for the request 500 includes object information 410 as in FIG. 5.

Referring to FIG. 7, shown is another example of a URL that may be sent from the client to the server as a request in an embodiment using a REST API in accordance with techniques herein. The example 600 is a further variation of the request from FIG. 4 in that the request 600 includes an additional second query parameter 610. Element 610 identifies an additional operation or processing (e.g., orderby) that is being requested to be performed by the server to order or sort the results in accordance with sorting criteria 612. The sorting criteria 612 may also be defined using an expression in a manner to that as described herein for defining an expression used with new property definitions. In this example, the sorting criteria 612 is an expression referencing the new property percentUsed defined by the previous expression 324 of the first URL query parameter 330. In this example, the sorting criteria 612 specifies "percentUsed asc" denoting sorting criteria to order the pool objects and requested properties in the response in ascending (asc) order of the new property percentUsed. Thus, the sorting criteria 612 indicates that the response should include sizeTotal, sizeUsed and percentUsed for all pool objects and additionally, information for the pool objects is to be sorted in ascending order based on percentUsed. Thus, generally, response lists requested object properties for different pool objects in an ascending order where the $n^{th}$ listed pool object in the response has a percentUsed value that is equal to or less than the percentUsed value for the n+1th object listed in the response.

In this particular example with only a single pool, the response returned for the request 600 includes object information 410 as in FIG. 5.

As described above in connection with FIGS. 6 and 7, &filter and &orderby denote additional URL parameters specifying additional operations or processing which the client is requesting that the server perform. Each of 510 and 610 is an additional URL query parameter specifying criteria using an expression that references the new property percentUsed. In connection with example syntax herein that may be used in an embodiment in accordance with techniques herein, generally a single URL GET request may include multiple query parameters where each pair of parameters are separated using a symbol such as "&". For example, a single URL GET request may include first and second query parameters as in FIG. 6 and additionally also include a third query parameter &orderby as denoted in 610 of FIG. 7.

An embodiment may include support for one or more query parameters used in connection with pagination. In one embodiment, two additional query parameters PAGE and PER_PAGE may be specified. The PER_PAGE query parameter may be used to denote a number of items that should be included in each page of result data. For example, the following syntax:

&PER PAGE=EXPRESSION may be used where "EXPRESSION" denotes an expression for an integer quantity. The EXPRESSION may be as described elsewhere herein which evaluates to an integer quantity using any of constants, operators, a predefined property, a new property generated on the server in accordance with another expression of the same URL request such as described herein, and the like. If no PER_PAGE option is specified in a GET request, the server may presume a default value.

The PAGE query parameter may be used to denote a particular page number with respect to query results which are to be returned in a response. By default, the page number may be "1". For example, the following syntax:

& PAGE=EXPRESSION may be used where "EXPRESSION" denotes an expression for an integer quantity. The EXPRESSION may be as described elsewhere herein which evaluates to an integer quantity using any of constants, operators, a predefined property, a new property generated on the server in accordance with another expression of the same URL request such as described herein, and the like.

Thus, the combination of PAGE and PER_PAGE may be used in a GET request to identify the particular rows or objects of the query result set to be returned in the response. For example, a web browser may issue a series of successive GET requests where each request retrieves a next set of information displayed in a user interface display. The first GET request may specify to return the first 10 rows or objects of the results set by including the following URL parameters in the first GET request:

GET . . . &PAGE=1 &PAGE_SIZE=10

The second GET request may specify to return the next or second set of 10 rows or objects of the results set by including the following URL parameters in the second GET request:

GET . . . &PAGE=2 &PAGE_SIZE=10

Finally, the third GET request may specify to return the final, third set of 10 rows or objects of the results set by including the following URL parameters in the third GET request:

GET . . . &PAGE=3 &PAGE_SIZE=10

As with the filter and orderby parameters and operations, an expression may be specified which references a new property defined in accordance with techniques as described herein. Thus, generally, the new property percentUsed as described above defines a customized expression which can be further reused or referenced in expressions of the same or other query parameters such as for filtering, paging and/or sorting.

Figure 8:
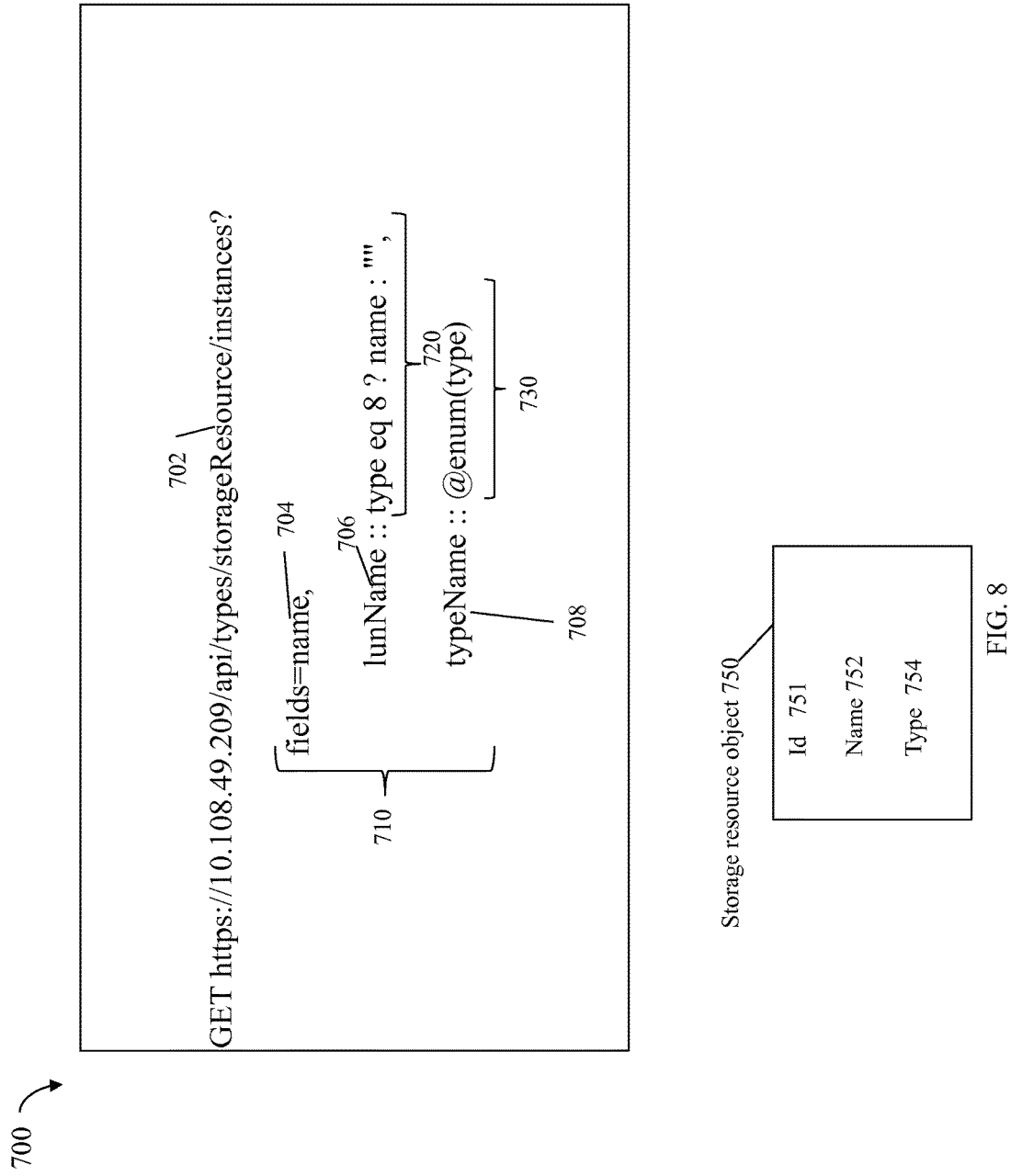
FIGS. 8 and 10 are examples of requests and objects that may be used in an embodiment in accordance with techniques herein.

Referring to FIG. 8, shown is another example 700 of a URL that may be sent from the client to the server as a request in an embodiment using a REST API in accordance with techniques herein. The example 700 follows a general template as described above in connection with other examples. In this example 700, the request is made with respect to all storage resource objects as denoted by 702.

Also included in FIG. 8 is an example of a representation of a storage resource object 750 which may include an Id 751, a name property 752, a type property 754 and one or more other properties. The name property 752 may be a string identifying the storage resource name. The type property 754 may identify a particular type of storage resource. The Id property 751 may be an identifier for this object used to uniquely identify the object instance from all other storage resource objects.

A storage resource may generally be any one of a set of defined logical storage entity types (as denoted by type property 754) including, for example, "LUN" and "virtual machine data store". The LUN type denotes a logical device storage entity. The "virtual machine data store" type denotes a logical device or portion of storage allocated for use with applications executing in a virtual machine. Virtual machines (VMs) execute in a virtualized environment. For example, an embodiment may have one or more VMs executing on a single physical machine in a virtualized environment using virtualization software produced by VMware, Inc. In the context of each virtual machine, one or more applications may be executed, where the applications may include any one or more of, for example, an email application such as Microsoft Exchange, a web server, or a database application. The storage resource of type virtual machine data store may be used to store data of such applications executing in the context of a VM. In one embodiment illustrated in FIG. 8, the type property 754 may be an integer value denoting one of the predefined storage resource types. For example, a type property value of 8 may denote the LUN type.

Element 710 specifies a URL query parameter identifying the object properties requested for each storageResource object. Element 704 specifies that the first predefined object property "name" 752 is to be included in the response for each storage resource object. Element 706 defines a first new property lunName represented as in expression 720. The expression 720 is a further example of a conditional expression that may be used in an embodiment in accordance with techniques herein. In 720, the expression of "type eq 8 ? name: " " "is syntax for a conditional expression indicating the following logic:

If (type property of the resource object=8 denoting a LUN)
then lunName=type property
else lunName=" "

Thus, for a storage resource object, if its type property 754 is 8 (thereby denoting that the storage resource object represents a LUN), the new property lunName is assigned the value of the object's name property 752. Otherwise, the new property lunName is assigned NULL.

Element 708 defines a second new property typeName represented as in expression 730. The expression 730 is yet a further example of a functional operation that may be used in an embodiment in accordance with techniques herein. In 730, the expression of "@enum(type)" is syntax for converting the integer value of the type property to a corresponding string name for the denoted type. For example, a mapping may be defined denoting string values corresponding to the set of integer values for the different possible integers that can be specified as a type property 754. Each such integer may map or correspond to a string value denoting a named string for type. For example, a type property value of 8 maps or corresponds to "LUN" where "LUN" may be used as the typeName property value. Another integer value for the type property maps or corresponds to "virtual machine data store" where virtual machine data store" may be used as the typeName property value. With reference to 730, @enum(type) may be an expression evaluated to determine the string value of the defined mapping corresponding to the integer value of the type property 754.

Figure 9:

Referring to FIG. 9, shown is an example 800 of a response that may be returned by the server for the request 700 of FIG. 8. The example 800 includes a response in accordance with the HTTP protocol or standard and includes the requested information for the storage resource objects of the data storage system configuration information. In this simplified example, there are two storage resource objects although an embodiment may practically include any suitable number of storage resource objects for the particular data storage system configuration. In this example, element 808 denotes the number of entries or storage resource objects having properties listed in the request. Element 810 includes the requested object properties of the request for each storage resource object. In this example as mentioned above there are two storage resource objects where element 812 indicates the information returned for the first resource object representing a LUN and element 814 indicates information returned for the second resource object representing a virtual machine data store.

For the first storage resource object denoted by element 812, element 820 denotes the id or identifier property value uniquely identifying the storage resource object instance from all other storage resource objects. It should be noted that the identifier may be returned for each object instance in order to distinguish and identify the different object instances. Element 822 specifies the property value for the predefined property name. Element 824 specifies the property value for the first new property typeName based on evaluation of 720 for this object. Element 826 specifies the property value for the second new property lunName based on evaluation of 730 for this object.

For the second storage resource object denoted by element 814, element 830 denotes the id or identifier property value uniquely identifying the storage resource object instance from all other storage resource objects. Element 832 specifies the property value for the predefined property name. Element 834 specifies the property value for the first new property typeName based on evaluation of 720 for this object. Element 836 specifies the property value for the second new property lunName based on evaluation of 730 for this object.

Figure 10:
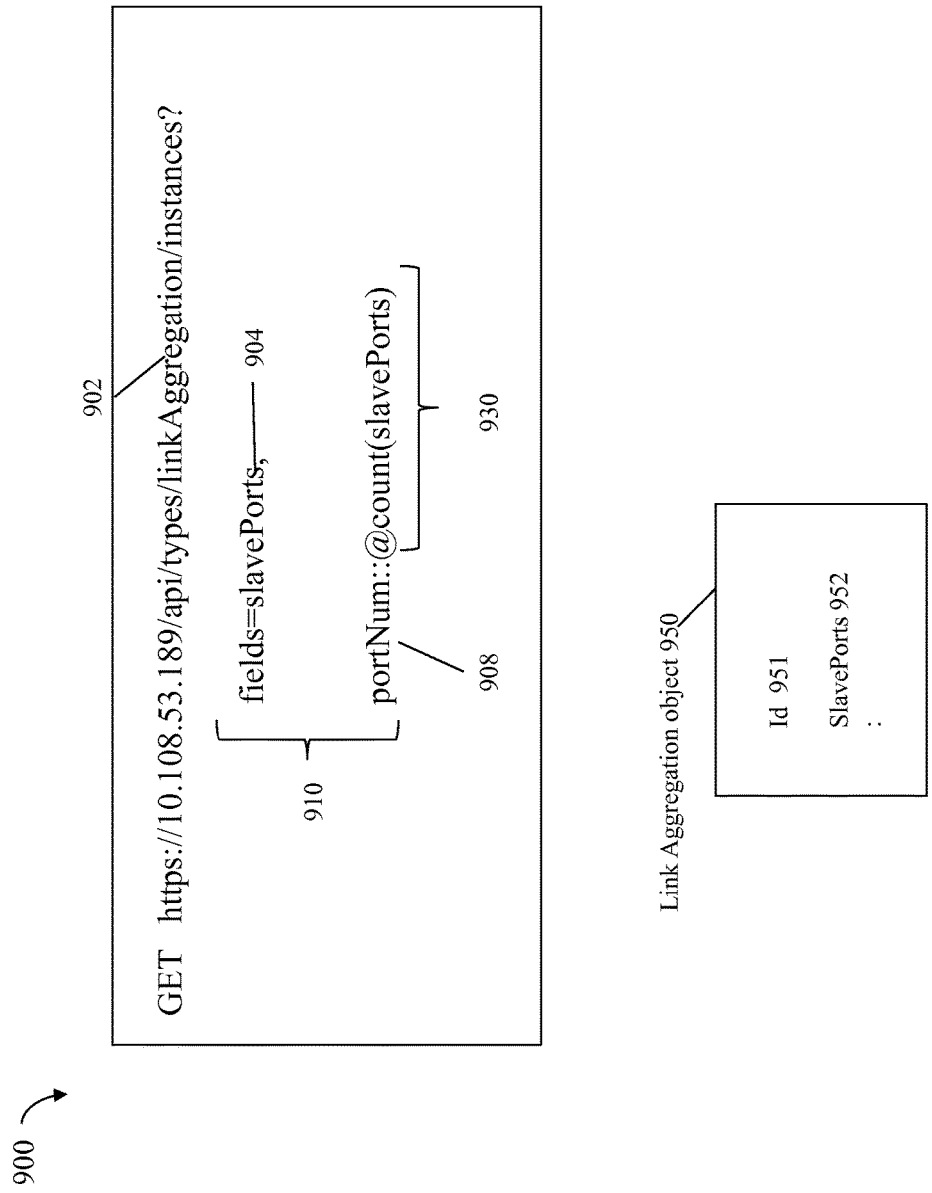

Referring to FIG. 10, shown is another example 900 of a URL that may be sent from the client to the server as a request in an embodiment using a REST API in accordance with techniques herein. The example 900 follows a general template as described above in connection with other examples. In this example 900, the request is made with respect to all link aggregation objects as denoted by 902. A link aggregation object may generally represent a logical grouping of multiple network connections.

Also included in FIG. 10 is an example of a representation of a linkAggregation object 950 which may include Id 951, a slavePorts property 952 and one or more other properties. The slavePorts property 952 may list the names or identifiers of slave ports of the link aggregation object. For example, property 952 may be an array of strings where each entry in the array includes a string identifier for a different slave port. The Id 951 is an identifier uniquely identifying a linkAggregation object.

Element 910 specifies a URL query parameter identifying the object properties requested for each linkAggregation object. Element 904 specifies that the first predefined object property "slavePorts" 952 is to be included in the response for each linkAggregation object. Element 908 defines a first new property portNum represented as in expression 930. The expression 930 is yet a further example of a functional operation that may be used in an embodiment in accordance with techniques herein. In 930, the expression of "@count (slavePorts)" is syntax for an operation to count the number of slavePorts. In an embodiment where the slavePorts property 952 is an array of strings as described above, evaluation of 930 "@count(slavePorts)" may return an integer value identifying the number of entries in the array of strings.

Referring to FIG. 11, shown is an example 1000 of a response that may be returned by the server for the request 900 of FIG. 10. The example 1000 includes a response in accordance with the HTTP protocol or standard and includes the requested information for the storage resource objects of the data storage system configuration information. In this simplified example, there is only a single linkAggregation object although an embodiment may practically include any suitable number of such objects for the particular data storage system configuration.

In this example, element 1002 denotes the number of entries or linkAggregation objects having properties listed in the request. Element 1010 includes the requested object properties of the request for each linkAggregation object. Element 1012 indicates the information returned for the first linkAggregation object. For the first linkAggregation object denoted by element 1012, element 1024 denotes the id or identifier uniquely identifying the linkAggregation object instance from all other linkAggregation objects. It should be noted that the unique identifier (e.g., 1024) for the link aggregation object may be returned for each object instance even though not specified in the GET request. Elements 1020 and 1022 specifies the property value for the predefined property slavePorts. Element 1026 specifies the property value for the new property portNum based on evaluation of 930 for this object.

In one embodiment in accordance with techniques herein, the data storage configuration information may be stored in an SQL (Structured Query Language) database. As known in the art, SQL is a language used to perform operations on the database. Such operations may include retrieving or reading information from the database, updating existing information in the database (e.g. modify or change a value of an object property), deleting existing information from the database (e.g., deleting an object from the database), and/or writing new information to the database (e.g., creating new object in the database). In such an embodiment, the GET URL request may be sent from the client and received at the server where the server then performs processing to transform the request into an SQL statement or, more generally, a database query request to obtain the requested object information from the database.

Figure 11B:
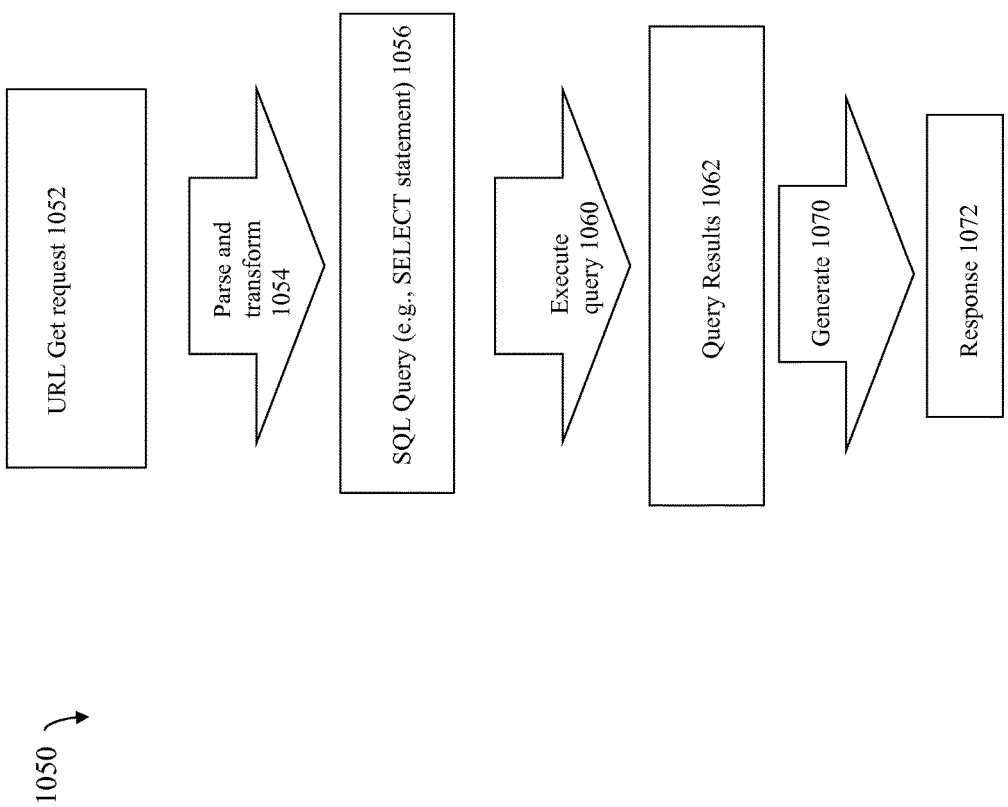
FIGS. 11B and 13 are examples illustrating processing that may be performed in an embodiment in accordance with techniques herein.

In particular, with reference to FIG. 11B, the GET request 1052 received at the server may include a new property definition as described herein such as illustrated in examples of requests in FIGS. 4, 6, 7, 8 and 10. The request 1052 may be parsed and transformed 1054 into an SQL query 1056 to derive a "new column" in the query results from an expression defined in the GET request. The new column corresponds to the new property may be derived from one or more existing predefined object properties as defined by the expression in the GET request. The expression may be based on one or more existing columns of database tables where the existing columns correspond to predefined object properties in the object model of the database.

In one embodiment, the received GET request may be parsed and transformed 1054 into a database query request that is an SQL SELECT statement. It should be noted that the SQL SELECT statement and syntax described herein for the database query may be considered a general representation of the database query statements, clauses, operators, and the like, that may be included in a query used to obtain the requested data. The syntax used to actually implement such a query may vary with database, query language, and the like, as may be utilized in an embodiment. Despite any such variations, those skilled in the art will recognize the particular query statements and keywords, operations, conditions and the like, (e.g., SELECT statement and various clauses such as WHERE, ORDER BY, and the like) and associated semantics as known in the art in connection with databases.

Once the SQL query 1056 has been determined, the query 1056 may be executed 1060 with respect to the data storage system configuration database to obtain the query results 1062 used to generate 1070 the response 1072. As described herein, the query results 1062 from the database may be placed in a suitable form for the response returned to the client. In one embodiment, the response may be an HTTP response such as illustrated, for example, in FIGS. 5, 9 and 11.

Generally, processing of step 1054 (e.g., parsing and transforming the GET request into an SQL query) and step 1070 (e.g., generating the response 1072 from the query results 1062) may be performed in any suitable manner such as, for example, by executing a script, executable code generated using a programming language, and the like, to perform the necessary processing.

In one embodiment in accordance with techniques herein, the GET request may be parsed and transformed in step 1054 into a SELECT statement having the following general format and syntax with various clauses included or omitted depending on the particular GET request.

SELECT columns FROM table
WHERE filtering_criteria
ORDER BY ordering_criteria where
table identifies the particular database table from which data is to be retrieved;
columns identifies one or more columns of the table for which data is be retrieved;
filtering criteria identifies any selection or filtering criteria of the GET request as may be specified using the "filter=" URL parameter such as illustrated in FIG. 6; and
ordering criteria identifies any ordering criteria of the GET request as may be specified using the "orderby" URL parameter such as illustrated in FIG. 7.

The WHERE clause identifies the particular filtering criteria that must be met or matched by a table row of the database table in order for the columns of the particular table row to be retrieved by the Select statement query.

The ORDER BY clause specifies the ordering criteria used to sort, rank or order the table rows meeting the filtering criteria of the WHERE clause.

The "columns" of the SELECT statement query may be specified using column aliases with an AS clause. As noted above, "columns" identifies the one or more database table columns to be retrieved. The AS clause may be used to specify alternative new names or column aliases of the result set. For a column COL1 to be retrieved from the database table, the SELECT statement may include a column alias of the form:

COL1 AS Alias1
where
COL1 identifies the database table column name; and
Alias1 identifies the column alias that is the alternative or new name or new name column of the query result set.

COL1 may more generally be an expression as described herein that is evaluated and used as the value for Alias1 in the query result set. COL1 may identify, for example, a single column name of the database table, or may generally be an expression such as described herein (e.g., may reference one or more columns, constants, and the like used to calculate or determine a value for Alias1 in the query result set). In this manner, a GET request specifying a "new property=expression" (e.g., such as for the new property percentUsed::sizeUsed*100/sizeTotal as in FIG. 6) may be transformed into a column alias where the "expression" is used as COL1 and the "new property" defined is the column alias, Alias1 (e.g., transformed to the column alias "expression AS new property).

It should be further noted that, in one embodiment in accordance with techniques herein, the new property which is a column alias, Alias1, may be further used in an ORDER BY clause such as referenced in the sorting criteria. However, the new property as a column alias may not be used in the WHERE clause such as referenced in the filtering criteria.

As also described elsewhere herein, an embodiment may also support the PER_PAGE option parameter (e.g., PER_PAGE=expression) as described above that limits the amount of data that may be returned in a response and the PAGE option parameter (e.g., PAGE=expression) to specify the starting point in page in the query results table for returning information to the client.

In such an embodiment, the PER_PAGE parameter and its associated expression and also the PAGE parameters and its associated expression may also be directly mapped or transformed into corresponding portions of an SQL query such as additional clauses of the resulting SELECT statement described above and elsewhere herein.

For example, in addition to the general format of the SELECT statement noted above, for the PER_PAGE parameter, the SELECT statement also include an additional clause such as a FETCH FIRST clause appended to the end of the general SELECT format noted above. The FETCH FIRST clause may have a syntax and format such as:

FETCH FIRST n ROWS ONLY where "n" is the number of rows of the query results to return. "n" may be an integer, or more generally, an expression such as described herein that evaluates to an integer value. In one embodiment, the "expression" specified in the PER_PAGE option may be transformed or mapped as the "n" of the FETCH FIRST clause of the SELECT statement.

In addition to the general format of the SELECT statement noted above, for the PAGE parameter, the SELECT statement also include an additional clause such as an OFFSET clause. The OFFSET clause may have a syntax and format such as:

OFFSET m ROWS where "m" denotes the offset or starting point in the query result set after which subsequent rows of the query results are returned. "m" may be an integer, or more generally, an expression such as described herein that evaluates to an integer value (non-negative). In one embodiment, the "expression" specified in the PAGE option may be transformed or mapped into a value used for the "m" of the OFFSET clause of the SELECT statement. In particular, if the PAGE option specifies PAGE X, a value for "m" may be determined as (X−1)*"n" where "n" is the number of rows per page (e.g., "n" as in the PER_PAGE option).

In the SELECT statement, an embodiment may specify the OFFSET clause following by the FETCH FIRST clause.

Generally, the client may request a particular number of rows of the query results in a GET request using the combination of the PAGE and PAGE_OFFSET parameters as described herein.

Further details regarding the processing performed at the server 1050 to service the request will now be described with reference to an example.

Figure 12:
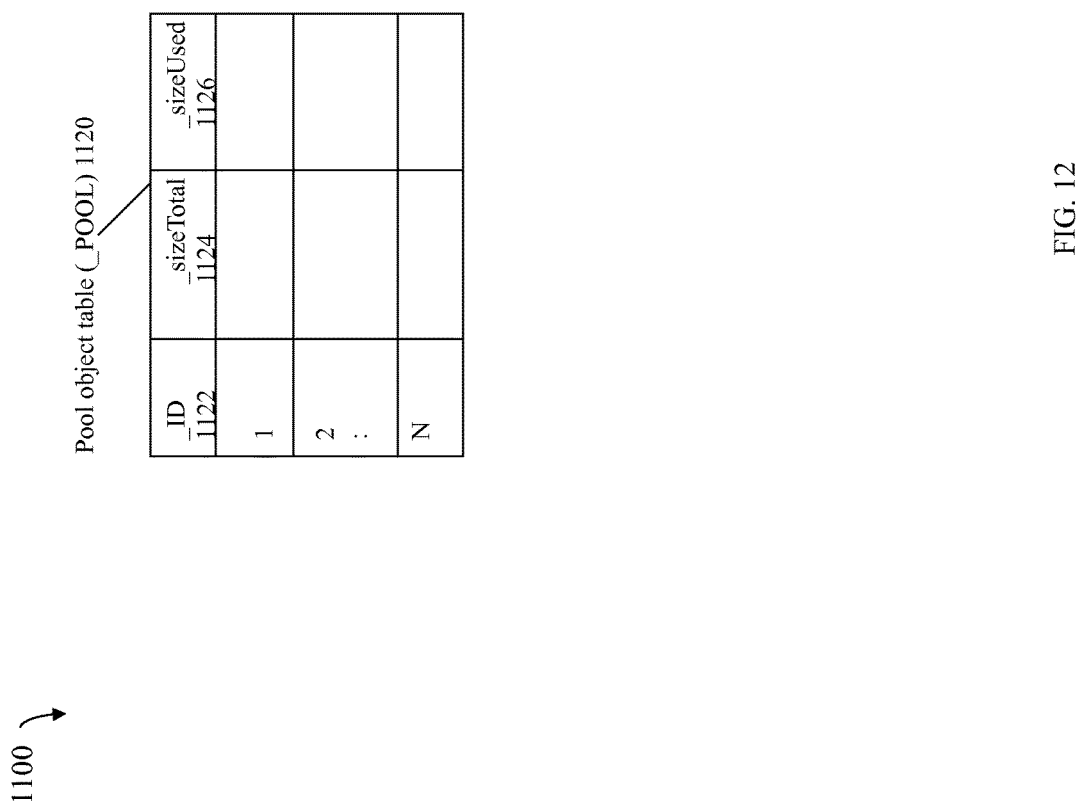

Referring to FIG. 12, shown is an example 1100 of a pool object table _POOL 1120 that may be used in an embodiment in accordance with techniques herein. The _POOL table 1120 is an example of a database table that may be included in the data storage configuration information database (e.g., 220 of FIG. 2) used in an embodiment in accordance with techniques herein. In the pool object table _POOL 1120, each row corresponds to a different pool object and includes property values for each such pool object. The table _POOL 1120 includes columns 1122, 1124 and 1126 each corresponding to a different property of a pool object. Column 1122 _ID includes the pool id uniquely identifying the pool object of a particular table row. Thus, column 1122 is used as the primary key or index into the table 1120. Column 1124 includes values for the predefined property _sizeTotal for each pool object. Column 1126 includes values for the predefined property _sizeUsed for each pool object. Although not illustrated, the table 1120 may also include other predefined properties for pool objects. The table _POOL 1120 may be a database table of pool objects where each such pool object is as described elsewhere herein such as in connection with FIG. 3. In a similar manner, the data storage system configuration database may include tables of other objects such as a table of storageResource objects (as described in FIG. 8), a table of linkAggregation objects (as described in FIG. 10), and the like, for the various objects used to represent the different entities in the data storage system configuration. In this example, columns of the database table have names beginning with an underscore (e.g., _____) which correspond to similar named items in a GET request described below omitting the underscore.

It should be noted that in at least one embodiment, the linkAggregation objects 950 of FIG. 10 may be generated as a result of information from multiple database tables. In other words, the generated object may have its data stored in more than one table whereby such data is extracted from the multiple tables of the database when generating an object returned to the client. For example, in one embodiment, the database may include a tables of link aggregations and another table of slave ports. The table of link aggregations may not include columns for any references or IDS to slave ports. Rather, each slave port entry in the slave port table may include a foreign key that points to its associated link aggregation entry in the link aggregation table. Thus, the single link aggregation object 950 of FIG. 10 may be formed by joining information from both the link aggregation table and slave port table. Generally, an embodiment may use any suitable organization of one or more database tables to store the information for a particular object type.

Figure 13:
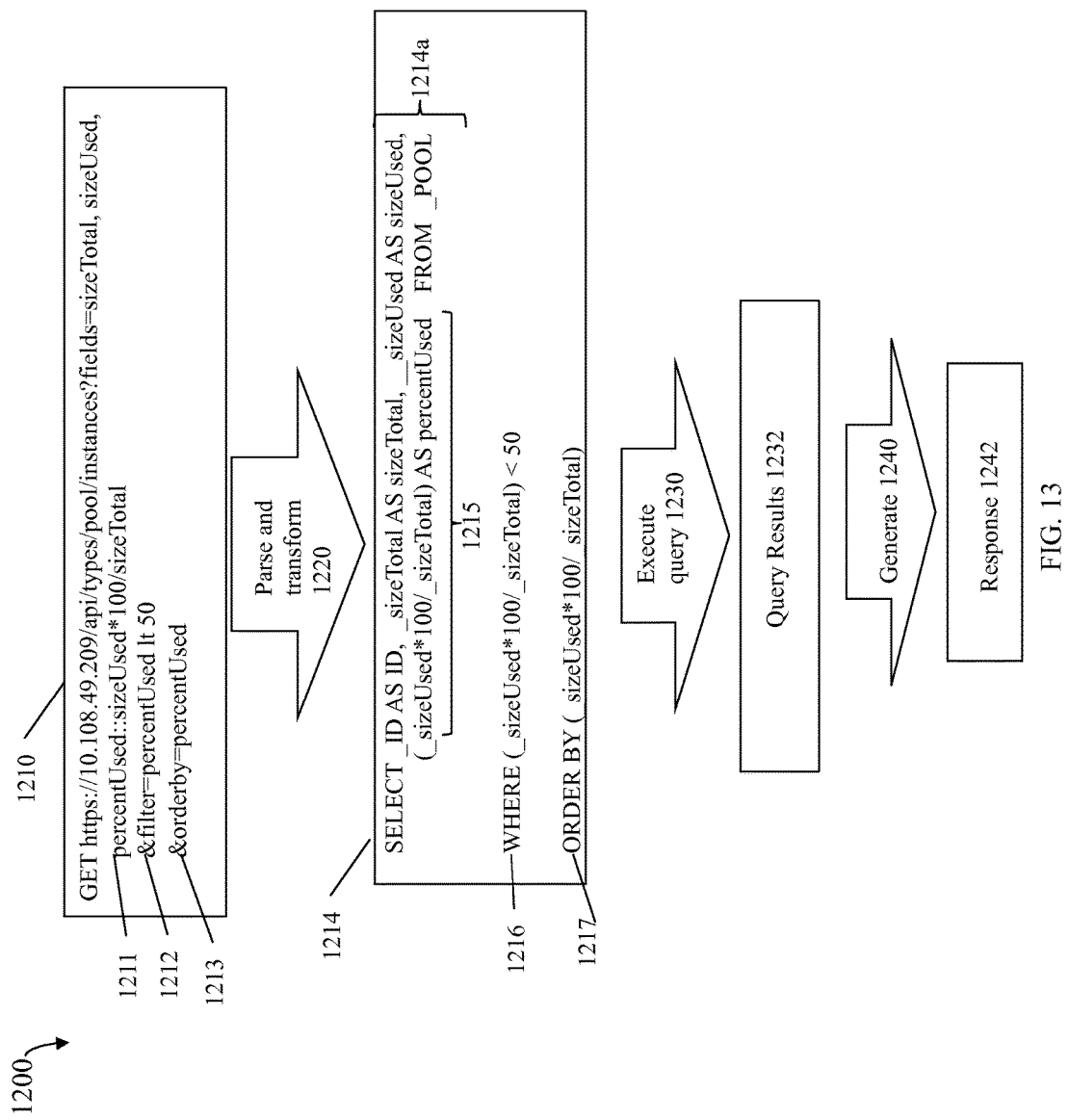

The processing of FIG. 11B may be performed with respect to a GET request, such as any of the GET requests of FIG. 4, 6, or 7. For example, with reference to FIG. 13, shown is additional detail regarding processing that may be performed by the server for a GET request 1210 including a combination of URL query parameters for orderby and filter as illustrated, respectively, in FIGS. 6 and 7. In other words, the request 1210 applies both filtering criteria and ordering or sorting criteria to the query results obtained.

As a first step on the server, the request 1210 may be parsed and transformed 1220 into an SQL query 1214 that is SELECT statement 1214 generated from portions of the GET request as described above. For example, in 1214*a* each of the object properties (e.g., sizeTotal, sizedUsed and percentUsed) in the first URL parameter of the GET request is mapped to a corresponding column of the_POOL database table using a column alias.

Element 1215 denotes the column alias specified in the SELECT statement corresponding to the new property and its expression in line 1211 of the request. Element 1216 denotes the WHERE clause corresponding to the filtering criteria from line 1212 of the request. Element 1217 denotes the ORDER BY clause corresponding to the sorting or ordering criteria from line 1213 of the request.

As a second step on the server, the SELECT query statement 1214 may be executed with respect to the data storage system configuration database to obtain query results 1232 in accordance with the request 1210. In this manner, an embodiment in accordance with techniques herein may have the database calculate and return the new property values as a result of executing the SQL database query 1214.

Referring to FIG. 14, shown is an example representation of a query results table 1140 that may be generated as a result of executing the SELECT statement 1214. In the table 1140, each row corresponds to a different pool object meeting the filtering criteria of line 1212 of the request whereby the rows of table 1140 are further ranked or sorted based on the sorting criteria of line 1213 of the request. Table 1140 includes columns 1142, 1144, 1146 and 1148 each corresponding to a different property of a pool object. Columns 1142, 1144, and 1146 correspond respectively to columns 1122, 1124 and 1126 of the database table 1120. Column 1142 ID includes the pool id uniquely identifying the pool object of a particular table row. Additionally column 1148 corresponds to the new property "percentUsed" as defined by the expression "sizeUsed*100/sizeTotal" in line 1211 of the GET request 1210. Thus column 1148 is not a predefined property of the pool objects but is rather dynamically generated for the single request in accordance with techniques herein.

As will be appreciated by those skilled in the art, the query results table generated as a result of executing the SELECT statement as illustrated in FIG. 14 may not be an actual resulting database table stored physically in the database or on persistent physical storage. Rather, the query results table may be virtual or in-memory table including the results of the query.

Returning to FIG. 13, as a third step on the server, the query results 1232, such as the query results table 1140, may be further processed to generate 1240 a response 1242 having a suitable format to be returned to the client. As described herein, in one embodiment, the response 1242 may be an HTTP response including information for each pool object such as illustrated in connection with FIG. 5.

Referring to FIG. 15, shown a slightly modified version of the SELECT statement that may be generated as a result of perform step 1220 of FIG. 13 in an embodiment in accordance with techniques herein. The example 1300 includes a SELECT statement similar to 1214 with a difference that the ORDER BY clause of line 1302 references the new property percentUsed rather than the defined expression "sizeUsed*100/sizeTotal" as in line 1217 of 1214.

Figure 16:
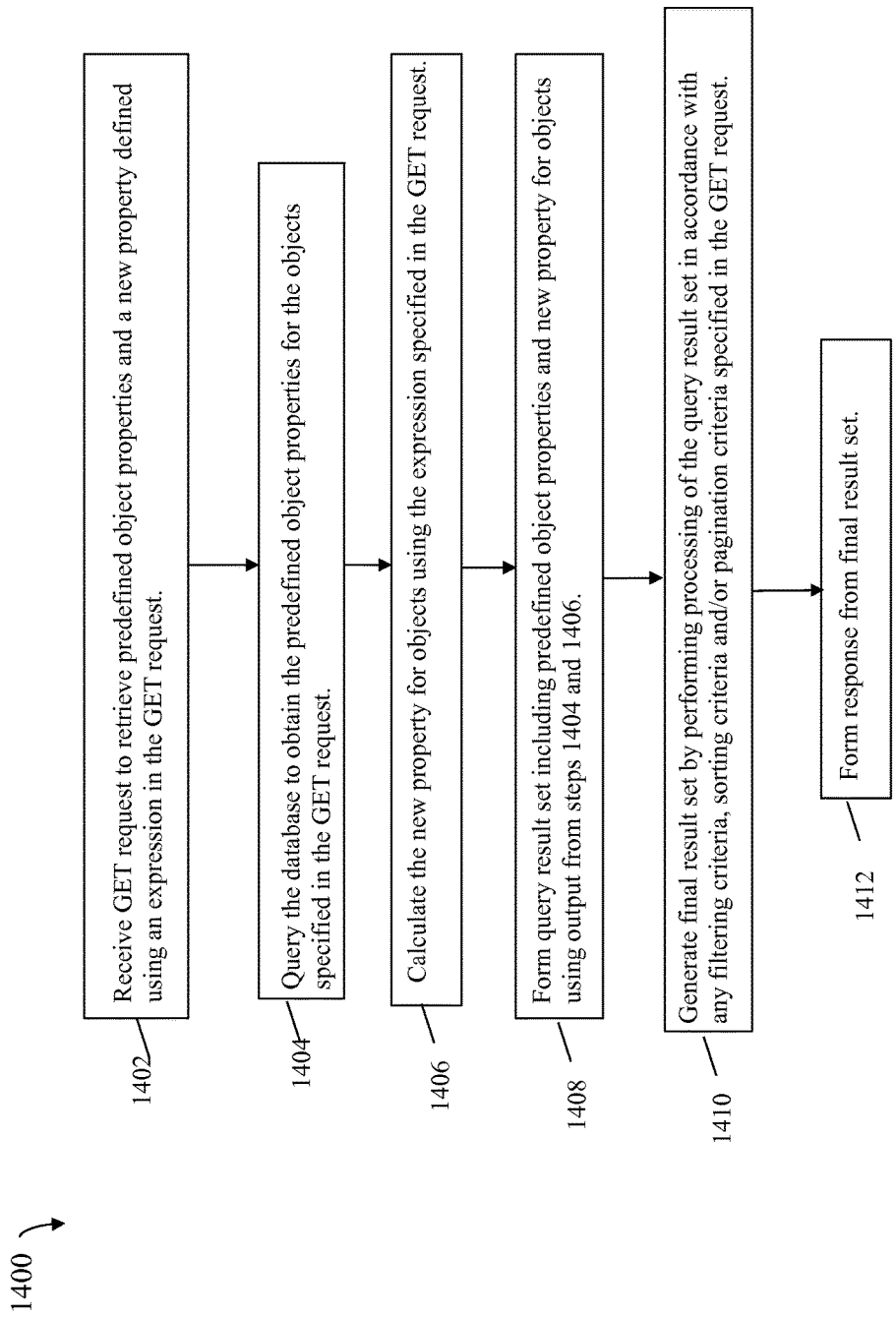
FIG. 16 is a flowchart of processing steps that may be performed in an embodiment in accordance with techniques herein.

Referring to FIG. 16, shown is a flowchart of processing steps that may be performed in an embodiment in accordance with techniques herein on the server to generate a response for a received request. The steps of 1400 may be performed as an alternative to the transformation process as described in connection with FIGS. 11B and 13. In this alternative processing, the GET request is received and the new property may be calculated in step 1406 described below using a programming approach such as by executing code, script, and the like. Similarly, step 410 processing may be performed using a programming approach such as by executing code, script, and the like.

At step 1402, the GET request is received at the server form the client. The GET request may be as described elsewhere herein, such as in connection with 1210 of FIG. 13. At step 1404, processing is performed to query and retrieve all predefined object properties for objects specified in the GET request. For example, if the request 1210 is being processed, step 1404 retrieves from the database for all pool objects the properties sizeTotal and sizeUsed along with corresponding pool IDs for all objects. At step 1406, the new property for all pool objects may be calculated, such as by executing code, a script, and the like, in accordance with the expression specified for the new property in the GET request. For example, for request 1210, step 1406 calculates the new property percentUsed as defined by the expression in line 1211. At step 1408, a query result set including the pool objects and corresponding predefined and new property values for each such pool object. The predefined property values for the pool objects are as obtained in connection with step 1404 and the new property values are as determined in step 1406. Step 1408 may include, for example, forming a table as in FIG. 14 but with respect to all pool objects from the database. Step 1410 may further process the query result set from step 1408 in accordance with any filtering criteria (e.g., filter parameter), sorting criteria (e.g., orderby parameter) and pagination criteria (e.g., PAGE and PER_PAGE) specified in the GET request. For example, step 1410 may include performing such processing in accordance with filtering criteria 1212 and sorting criteria 1213 of the request 1210. At step 1412, a response, such as an HTTP response, is formed from the final result set of step 1410.

Thus, an embodiment in accordance with techniques herein may perform processing as described in FIGS. 11B and 13 where the new properties and associated expressions are transformed and directly map to corresponding portions of the SELECT statement whereby execution of the SELECT statement by the database also results in calculating or evaluating the expressions to determine values for the new properties. Additionally, execution of the SELECT statement by the database also results in the database software automatically performing any additional clauses such as processing for filtering in accordance with filtering criteria (e.g., due to WHERE clause), for sorting in accordance with sorting criteria (e.g., due to ORDER BY clause), and for pagination (e.g., due to OFFSET and FETCH FIRST clauses).

As another option, an embodiment in accordance with techniques herein may perform alternative processing as described in FIG. 16 processing. As yet another alternative, an embodiment may perform a combination of processing of FIGS. 11B and 13 for a first set of one or more objects and processing of FIG. 16 for another second set of one or more objects.

In an example of an embodiment in accordance with techniques herein, the API may support other operations on the objects besides the GET or read operation described herein such as to write a new object, update or modify an existing object, or delete an object. However, in such an embodiment, techniques herein to dynamically define a new property using an expression may be specified only in the GET or read operation request.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of request processing comprising:
  receiving, from a client and using a processor of a server, a request for first data to be returned to the client, said first data including a first property of an object and a second property of the object, wherein said object is included in an object model and is stored in a database, and wherein said second property is a predefined property of the object stored in the database, wherein said first property is not a predefined property of the object stored in the database, wherein said request includes a request parameter that dynamically defines said first property as a new property for use only in connection with said request and not for use in connection with any other request, wherein said first property is not added to the object model and is not added to the object as stored in the database, wherein said request defines the new property using an expression included in the request parameter, said expression including said second property that is a predefined property of the object stored in the database;

performing first processing using a processor of the server to service the request and obtain the first data, said first processing further including:

transforming the request into a database query, wherein the first property and the second property of the object are both included in the request, and wherein the database query directly includes the first property of the request and the second property of the request, and wherein the expression of the request used in dynamically defining the first property as the new property directly maps to an equivalent expression of the database query, wherein the first property defined as the new property is a column alias in the database query identifying the first property as a column name in query results, and wherein the column alias has a definition as specified in the equivalent expression that is used to calculate a value of the first property in the query results; and executing the database query with respect to a database to obtain the query results including the first data; and generating, using a processor of the server and in accordance with the first processing, a response to the request, said response including the first data.

2. The method of claim 1, wherein the server is a data storage system, the client performs data storage system management, and the request is a request to retrieve the first data including the object which represents an entity in the data storage system, said first data including data storage system configuration information stored in the database.

3. The method of claim 1, wherein the database query is a select statement.

4. The method of claim 3, wherein the request includes filtering criteria and said transforming includes a clause in the select statement specifying the filtering criteria.

5. The method of claim 4, wherein the filtering criteria of the request references the new property.

6. The method of claim 3, wherein the request includes sorting criteria and said transforming includes a clause in the select statement specifying the sorting criteria.

7. The method of claim 6, wherein the sorting criteria of the request references the new property.

8. The method of claim 3, wherein the request includes pagination criteria identifying a portion of the query results to be returned to the client, and said transforming includes one or more clauses in the select statement specifying the pagination criteria.

9. The method of claim 8, wherein the pagination criteria of the request references the new property.

10. The method of claim 1, wherein the definition of the column alias is the definition of the first property and the new property, and the definition for the new property and the first property is recognized and used by the server only for servicing the request and not any other requests from the client.

11. The method of claim 1, wherein the request and response are in accordance with a defined application programming interface, wherein the defined application programming interface includes a first parameter, and wherein said request specifies said first parameter comprising said second property, said first property and said expression.

12. A system comprising:
a data storage system; and
a computer system comprising a memory including code of a data storage system management application, wherein the data storage system is a server and the data storage system management application is a client; and
said data storage system further comprises a second memory including code thereon that, when executed, performs a method of request processing comprising:

receiving, at the data storage system from the data storage system management application, a request for first data to be returned to the data storage system management application, said first data including a first property of an object and a second property of the object, wherein said object is included in an object model and is stored in a database, and wherein said second property is a predefined property of the object stored in the database, wherein said first property is not a predefined property of the object stored in the database, wherein said request includes a request parameter that dynamically defines said first property as a new property for use only in connection with said request and not for use in connection with any other request, wherein said first property is not added to the object model and is not added to the object as stored in the database, wherein said request defines the new property using an expression included in the request parameter, said expression including said second property that is a predefined property stored in the database;

performing first processing at the data storage system to service the request and obtain the first data, said first processing further including:

transforming the request into a database query, wherein the first property and the second property of the object are both included in the request, and wherein the database query directly includes the first property of the request and the second property of the request, and wherein the expression of the request used in dynamically defining the first property as the new property directly maps to an equivalent expression of the database query, wherein the first property defined as the new property is a column alias in the database query identifying the first property as a column name in query results, and wherein the column alias has a definition as specified in the equivalent expression that is used to calculate a value of the first property in the query results; and executing the database query with respect to a database to obtain query results including the first data; and generating, at the data storage system in accordance with the first processing, a response to the request, said response including the first data.

13. A non-transitory computer readable medium comprising code stored thereon that, when executed, performs a method of request processing comprising:

receiving, from a client and using a processor of a server, a request for first data to be returned to the client, said first data including a first property of an object and a second property of the object, wherein said object is included in an object model and is stored in a database, and wherein said second property is a predefined property of the object stored in the database, wherein said first property is not a predefined property of the object stored in the database, wherein said request includes a request parameter that dynamically defines said first property as a new property for use only in connection with said request and not for use in connection with any other request, wherein said first property is not added to the object model and is not added to the object as stored in the database, wherein said request defines the new property using an expression included in the request parameter, said expression including said second property that is a predefined property of the object stored in the database;

performing first processing using a processor of the server to service the request and obtain the first data, said first processing further including:

transforming the request into a database query, wherein the first property and the second property of the object are both included in the request, and wherein the database query directly includes the first property of the request and the second property of the request, and wherein the expression of the request used in dynamically defining the first property as the new property directly maps to an equivalent expression of the database query, wherein the first property defined as the new property is a column alias in the database query identifying the first property as a column name in query results, and wherein the column alias has a definition as specified in the equivalent expression that is used to calculate a value of the first property in the query results; and executing the database query with respect to a database to obtain query results including the first data; and generating, using a processor of the server and in accordance with the first processing, a response to the request, said response including the first data.

14. The non-transitory computer readable medium of claim 13, wherein the server is a data storage system, the client performs data storage system management, and the request is a request to retrieve the first data including the object which represents an entity in the data storage system, said first data including data storage system configuration information stored in the database.

15. The non-transitory computer readable medium of claim 14, wherein the database query is a select statement.

16. The non-transitory computer readable medium of claim 15, wherein the request includes filtering criteria and said transforming includes a clause in the select statement specifying the filtering criteria.

17. The non-transitory computer readable medium of claim 13, wherein the request includes any of filtering criteria referencing the new property, sorting criteria referencing the new property, and pagination criteria referencing the new property.

18. The non-transitory computer readable medium of claim 13, wherein the definition of the column alias is the definition of the first property and the new property, and the definition for the new property and first property is recognized and used by the server only for servicing the request and not any other requests from the client.

* * * * *